US012774109B1

(12) United States Patent
Yazici et al.

(10) Patent No.: US 12,774,109 B1
(45) Date of Patent: Oct. 27, 2026

(54) ELECTRIC COOLING SYSTEM FOR AIRCRAFT POWERPLANT

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/301,397

(22) Filed: Aug. 15, 2025

(51) Int. Cl.
*B64D 33/08* (2006.01)
*F02C 7/18* (2006.01)

(52) U.S. Cl.
CPC ................ *B64D 33/08* (2013.01); *F02C 7/18* (2013.01); *F05D 2260/232* (2013.01)

(58) Field of Classification Search
CPC ........................................................ F02C 7/12
See application file for complete search history.

(56) References Cited

U.S. PATENT DOCUMENTS 11,047,306 B1 * 6/2021 Millhaem ............. F01D 17/105
12,060,839 B1 * 8/2024 Muldoon ................ F01D 25/36
12,234,741 B2 2/2025 Kalyanasamy
2017/0335768 A1 * 11/2017 Steen ...................... F01D 9/065
2018/0010480 A1 * 1/2018 Hockaday ............... F01D 11/08
2018/0016933 A1 1/2018 Elbibary
2019/0162203 A1 * 5/2019 Shinde ...................... F02C 7/18
2020/0109639 A1 * 4/2020 Namadevan .............. F01D 9/06
2022/0235707 A1 * 7/2022 Millhaem ................. F02C 7/18
2023/0220799 A1 * 7/2023 Shinde ...................... F02C 7/18
60/226.1
2023/0323835 A1 * 10/2023 Kumar ...................... F02C 7/12
415/177
2024/0026821 A1 * 1/2024 Shinde ...................... F02C 7/12
2024/0352895 A1 * 10/2024 Kalyanasamy ......... F01D 25/08

* cited by examiner

*Primary Examiner* — David P. Olynick
(74) *Attorney, Agent, or Firm* — Getz Balich LLC

(57) ABSTRACT

A system is provided for an aircraft. This system includes a turbine engine and a cooling system. The turbine engine extends axially along an axis. The turbine engine includes a core flowpath, a compressor section, a combustor section and a turbine section. The core flowpath extends through the compressor section, the combustor section and the turbine section from an airflow inlet into the core flowpath to a combustion products exhaust from the core flowpath. The cooling system is configured to air cool the turbine engine following shutdown of the turbine engine. The cooling system includes a plurality of electric air movers. The electric air movers are arranged axially along the turbine engine.

20 Claims, 4 Drawing Sheets

ELECTRIC COOLING SYSTEM FOR AIRCRAFT POWERPLANT

BACKGROUND OF THE DISCLOSURE

1. Technical Field

This disclosure relates generally to an aircraft powerplant and, more particularly, to a cooling system for a turbine engine.

2. Background Information

An aircraft powerplant such as a turbofan propulsion system may utilize cool down operations post shutdown. Various cool down operations are known in the art. While these known cool down operations have various benefits, there is still room in the art for improvement.

SUMMARY OF THE DISCLOSURE

According to an aspect of the present disclosure, a system is provided for an aircraft. This system includes a turbine engine and a cooling system. The turbine engine extends axially along an axis. The turbine engine includes a core flowpath, a compressor section, a combustor section and a turbine section. The core flowpath extends through the compressor section, the combustor section and the turbine section from an airflow inlet into the core flowpath to a combustion products exhaust from the core flowpath. The cooling system is configured to air cool the turbine engine following shutdown of the turbine engine. The cooling system includes a plurality of electric air movers. The electric air movers are arranged axially along the turbine engine.

According to another aspect of the present disclosure, another system is provided for an aircraft. This system includes a turbine engine and a cooling system. The turbine engine extends axially along an axis. The turbine engine includes a core flowpath, a first rotating structure, a compressor section, a combustor section and a turbine section. The core flowpath extends through the compressor section, the combustor section and the turbine section from an airflow inlet into the core flowpath to a combustion products exhaust from the core flowpath. The first rotating structure includes a compressor rotor in the compressor section and a turbine rotor in the turbine section. The cooling system is configured to air cool the turbine engine. The cooling system includes a first electric air mover fluidly coupled to a bore of the first rotating structure. The first electric air mover is configured to direct cooling air into the bore of the first rotating structure.

According to still another aspect of the present disclosure, another system is provided for an aircraft. This system includes a turbine engine and a cooling system. The turbine engine extends axially along an axis. The turbine engine includes a core flowpath, a compressor section, a combustor section and a turbine section. The core flowpath extends through the compressor section, the combustor section and the turbine section from an airflow inlet into the core flowpath to a combustion products exhaust from the core flowpath. The cooling system is configured to air cool the turbine engine. The cooling system includes a first electric air mover fluidly coupled to (a) an internal compartment surrounding a core of the turbine engine and (b) the core flowpath within the core of the turbine engine. The first electric air mover is configured to direct cooling air into the internal compartment and the core flowpath.

The cooling system may also include a second electric air mover fluidly coupled to the core flowpath within a core of the turbine engine. The second electric air mover may be configured to direct additional cooling air into the core flowpath.

The cooling system may also include a second electric air mover fluidly coupled to a compartment surrounding a core of the turbine engine. The second electric air mover may be configured to direct additional cooling air into the compartment.

The turbine engine may also include a first rotating structure. The first rotating structure may include a first bladed rotor in the compressor section or the turbine section. The electric air movers may include a first electric air mover fluidly coupled to a bore of the first rotating structure. The first electric air mover may be configured to direct cooling air into the bore of the first rotating structure following the shutdown of the turbine engine.

The turbine engine may also include a second rotating structure. The second rotating structure may include a shaft and a second bladed rotor in the compressor section or the turbine section. The shaft may project axially through the bore of the first rotating structure.

The first electric air mover may also be fluidly coupled to a bore of the second rotating structure. The first electric air mover may also be configured to direct the cooling air into the bore of the second rotating structure following the shutdown of the turbine engine.

The turbine engine may also include a second rotating structure. The second rotating structure may include a second bladed rotor in the compressor section or the turbine section. The first rotating structure may also include a shaft projecting axially through a bore of the second rotating structure.

The electric air movers may include a first electric air mover fluidly coupled to the core flowpath within the compressor section. The first electric air mover may be configured to direct cooling air into the core flowpath within the compressor section following the shutdown of the turbine engine.

The electric air movers may include a second electric air mover fluidly coupled to the core flowpath within the compressor section. The second electric air mover may be configured to direct additional cooling air into the core flowpath within the compressor section following the shutdown of the turbine engine.

The electric air movers may include a first electric air mover fluidly coupled to the core flowpath within the turbine section. The first electric air mover may be configured to direct cooling air into the core flowpath within the turbine section following the shutdown of the turbine engine.

The electric air movers may include a first electric air mover fluidly coupled to a compartment surrounding a core of the turbine engine. The core of the turbine engine may include the compressor section, the combustor section and the turbine section. The first electric air mover may be configured to direct cooling air into the compartment following the shutdown of the turbine engine.

The electric air movers may include a second electric air mover fluidly coupled to the compartment. The second electric air mover may be configured to direct additional cooling air into the compartment following the shutdown of the turbine engine.

One or more of the electric air movers may be axially aligned with the compressor section along the axis.

At least one of the electric air movers may be axially aligned with the turbine section along the axis.

The system may also include a housing structure extending axially along and circumferentially about a core of the turbine engine. The core of the turbine engine may include the compressor section, the combustor section and the turbine section. The housing structure may also include a flowpath wall outside of the core of the turbine engine. At least some of the electric air movers may be mounted to the flowpath wall.

The system may also include an electric power source independent of the turbine engine. At least one of the electric air movers may be electrically coupled to and configured to receive electric power from the electric power source.

The system may also include an electric power storage. At least one of the electric air movers may be electrically coupled to and configured to receive electric power from the electric power storage.

At least one of the electric air movers may be electrically couplable to and operable to receive electric power from an apparatus outside of the aircraft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
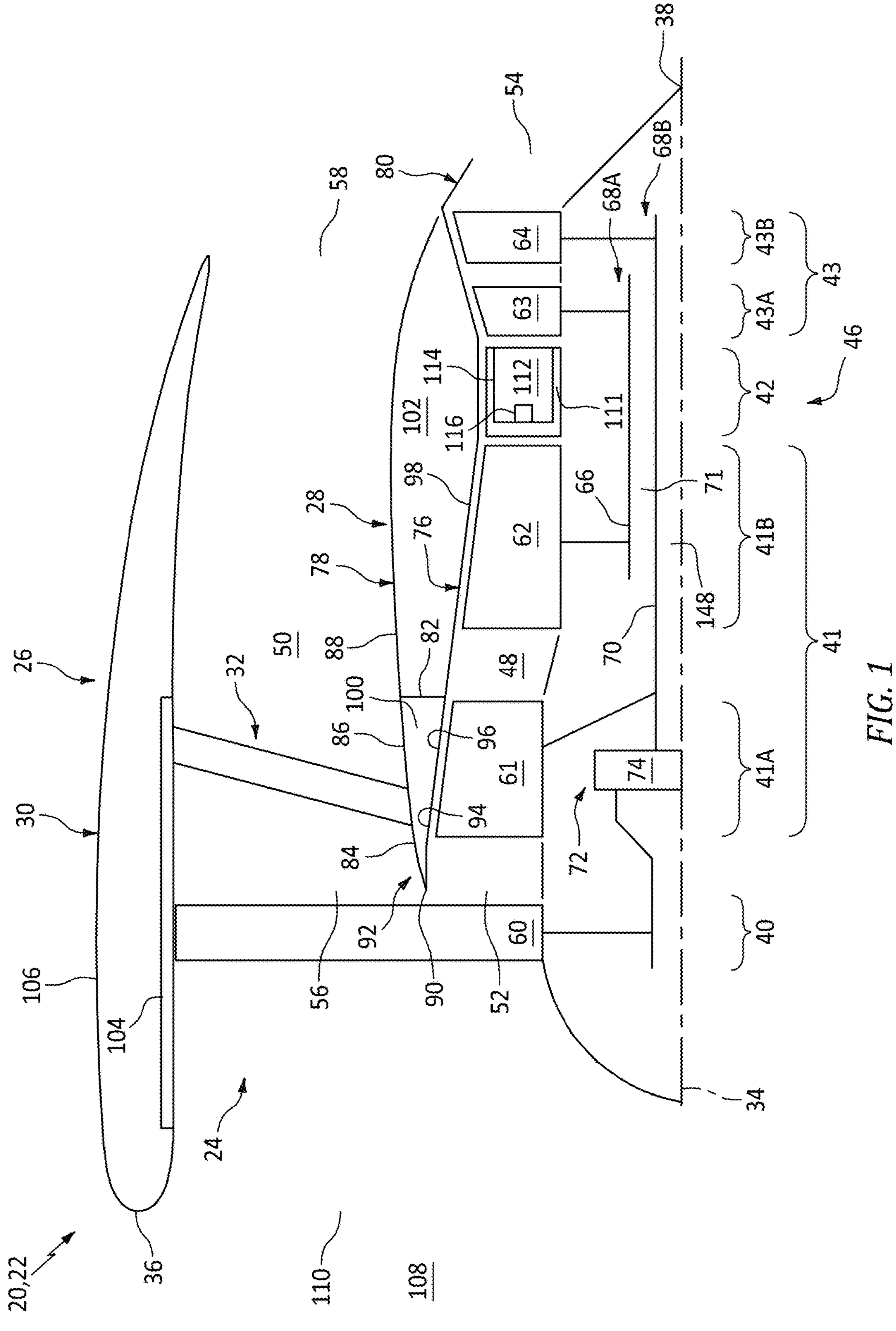
FIG. 1 is a partial schematic illustration of a propulsion system for an aircraft.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26. This propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 extends axially along an axis 34 of the aircraft propulsion system 22 between an axial forward end 36 of the aircraft propulsion system 22 and an axial downstream, aft end 38 of the aircraft propulsion system 22. Briefly, the propulsion system axis 34 may be a centerline axis of the aircraft propulsion system 22, the turbine engine 24 and/or one or more of its members. The propulsion system axis 34 may also or alternatively be a rotational axis for one or more members of the turbine engine 24.

The aircraft propulsion system 22 and its turbine engine 24 of FIG. 1 include a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. At least (or only) the LPC section 41A, the HPC section 41B, the combustor section 42, the HPT section 43A and the LPT section 43B collectively form a core 46 (e.g., a gas generator) of the turbine engine 24. The aircraft propulsion system 22 and its turbine engine 24 of FIG. 1 also include a core flowpath 48 (e.g., an annular core flowpath) and a bypass flowpath 50 (e.g., an annular bypass flowpath). The core flowpath 48 extends sequentially through the LPC section 41A, the HPC section 41B, the combustor section 42, the HPT section 43A and the LPT section 43B from an airflow inlet 52 into the core flowpath 48 to a combustion products exhaust 54 out from the core flowpath 48. The bypass flowpath 50 extends through a bypass duct from an airflow inlet 56 into the bypass flowpath 50 to an airflow exhaust 58 from the bypass flowpath 50, where the bypass duct may be formed by the inner housing structure 28 and the outer housing structure 30. The bypass flowpath 50 and its bypass duct are configured to bypass (e.g., are disposed radially outboard of and extend along) the engine core 46 and the inner housing structure 28.

The propulsor section 40, the LPC section 41A, the HPC section 41B, the combustor section 42, the HPT section 43A and the LPT section 43B may be arranged sequentially along the propulsion system axis 34 within the propulsion system housing 26. The propulsor section 40 includes a bladed propulsor rotor 60; e.g., a fan rotor. The LPC section 41A includes a bladed low pressure compressor (LPC) rotor 61. The HPC section 41B includes a bladed high pressure compressor (HPC) rotor 62. The HPT section 43A includes a bladed high pressure turbine (HPT) rotor 63. The LPT section 43B includes a bladed low pressure turbine (LPT) rotor 64. Each of these engine rotors 60-64 includes a rotor base (e.g., a disk or a hub) and a plurality of rotor blades (e.g., airfoils, vanes, etc.). The rotor blades may be arranged into one or more stages axially along the respective engine rotor 60-64. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 62 is coupled to and rotatable with the HPT rotor 63. The HPC rotor 62 of FIG. 1, for example, is connected to the HPT rotor 63 through a high speed shaft 66. At least (or only) the HPC rotor 62, the HPT rotor 63 and the high speed shaft 66 collectively form a high speed rotating structure 68A; e.g., a high speed spool of the turbine engine 24 and its engine core 46. This high speed rotating structure 68A of FIG. 1 and its members 62, 63 and 66 are rotatable about the propulsion system axis 34.

The LPC rotor 61 is coupled to and rotatable with the LPT rotor 64. The LPC rotor 61 of FIG. 1, for example, is connected to the LPT rotor 64 through a low speed shaft 70. At least (or only) the LPC rotor 61, the LPT rotor 64 and the low speed shaft 70 collectively form a low speed rotating structure 68B; e.g., a low speed spool of the turbine engine 24 and its engine core 46. This low speed rotating structure 68B of FIG. 1 and its members 61, 64 and 70 are rotatable about the propulsion system axis 34. The low speed rotating structure 68B may also be coaxial with the high speed rotating structure 68A. The low speed shaft 70 of FIG. 1 projects axially through an inner bore 71 of the high speed rotating structure 68A and its high speed shaft 66 between the LPC rotor 61 and the LPT rotor 64. The present disclosure, however, is not limited to such an exemplary coaxial arrangement.

The low speed rotating structure 68B is coupled to the propulsor rotor 60 through a rotating structure-to-propulsor (RSP) drivetrain 72. The RSP drivetrain 72 may be configured as a geared drivetrain, where a geartrain 74 (e.g., a transmission, a speed change device, an epicyclic geartrain, etc.) is disposed between and operatively couples the propulsor rotor 60 to the low speed rotating structure 68B and its LPT rotor 64. With this arrangement, the propulsor rotor 60 may rotate at a different (e.g., slower) rotational speed than the low speed rotating structure 68B and its LPT rotor 64. Here, the propulsor rotor 60 and the low speed rotating structure 68B may rotate in a common (the same) direction about the propulsion system axis 34 or in opposite directions about the propulsion system axis 34 depending, for example, upon the specific configuration of the geartrain 74. Alternatively, the RSP drivetrain 72 may be configured as a direct-drive drivetrain, where the geartrain 74 is omitted. With such an arrangement, the propulsor rotor 60 rotates at a common (the same) rotational speed as the low speed rotating structure 68B and its LPT rotor 64.

The inner housing structure 28 of FIG. 1 includes an inner case 76 (e.g., a core case), an inner wall structure 78, a core exhaust nozzle structure 80 and a bulkhead 82 (e.g., a firewall). The inner case 76 is disposed radially outboard of, extends axially along and may circumscribe one or more or all of the engine sections 41A-43B and the engine rotors 61-64. The inner case 76 may thereby house and provide a support structure for the respective engine sections 41A-43B and the engine rotors 61-64. Moreover, the inner case 76 may house and provide a support structure for the engine core 46.

The inner wall structure 78 is configured to provide an aerodynamic cover over the engine core 46 and its inner case 76. This inner wall structure 78 is also configured to form a radial inner peripheral boundary of the bypass flowpath 50. The inner wall structure 78 of FIG. 1, for example, includes a forward inner flowpath wall 84, an intermediate inner flowpath wall 86 and an aft inner flowpath wall 88. Briefly, the forward inner flowpath wall 84 is upstream of the intermediate inner flowpath wall 86 along the bypass flowpath 50, and the intermediate inner flowpath wall 86 is upstream of the aft inner flowpath wall 88 along the bypass flowpath 50.

The forward inner flowpath wall 84 may be configured as or otherwise include an outer casing of the inner housing structure 28. This forward inner flowpath wall 84 may form a radial inner platform for the guide vane structure 32. The forward inner flowpath wall 84 of FIG. 1, for example, projects axially (in an upstream, forward direction) from an axial downstream, aft end of the guide vane structure 32 to or near a leading edge 90 of a splitter structure 92. Here, the forward inner flowpath wall 84 extends axially along and may circumscribe at least a section 94 of the inner case 76 housing the LPC section 41A and its LPC rotor 61. The leading edge 90 of the splitter structure 92 forms a radial outer peripheral boundary of the core inlet 52 and a radial inner peripheral boundary of the bypass inlet 56.

The intermediate inner flowpath wall 86 may be configured as or otherwise include an aft inner diameter (ID) panel axially between the forward inner flowpath wall 84 and the aft inner flowpath wall 88. The intermediate inner flowpath wall 86 of FIG. 1, for example, extends axially from an axial downstream, aft end of the forward inner flowpath wall 84 and its guide vane structure 32 inner platform to an axial upstream, forward end of the aft inner flowpath wall 88. Here, the intermediate inner flowpath wall 86 extends axially along and may circumscribe another section 96 of the inner case 76 housing the compressor section 41 and, for example, its LPC section 41A.

The aft inner flowpath wall 88 may be configured as or otherwise include an inner barrel of a nacelle inner structure (e.g., an inner fixed structure (IFS)) for the aircraft propulsion system 22. The aft inner flowpath wall 88 of FIG. 1, for example, projects axially (in a downstream, aft direction) from the intermediate inner flowpath wall 86 to or near an axial upstream, forward end of the core exhaust nozzle structure 80. Here, the aft inner flowpath wall 88 extends axially along and circumferentially about at least another section 98 of the inner case 76 housing the engine sections 41B-43B and the engine rotors 62-64. Briefly, a trailing edge of the core exhaust nozzle structure 80 forms a radial outer peripheral boundary of the core exhaust 54.

The bulkhead 82 projects radially out from the inner case 76 to the intermediate inner flowpath wall 86. The bulkhead 82 is also mechanically fastened and/or otherwise attached to the inner case 76 and the intermediate inner flowpath wall 86. The bulkhead 82 of FIG. 1, in particular, is attached to the intermediate inner flowpath wall 86 at (or about) an axial downstream, aft end of the intermediate inner flowpath wall 86. The bulkhead 82 extends circumferentially about (e.g., completely around) the inner case 76 and the propulsion system axis 34. This bulkhead 82 may be configured as a firewall or other barrier spatially and/or fluidly dividing a forward inner housing compartment 100 of the inner housing structure 28 from an aft inner housing compartment 102 (e.g., an engine core compartment) of the inner housing structure 28. The forward inner housing compartment 100 may be formed by and extend radially between (a) the inner case 76 and (b) the forward inner flowpath wall 84 and the intermediate inner flowpath wall 86. This forward inner housing compartment 100 extends axially along the inner case 76 and the inner flowpath walls 84 and 86 (in the downstream, aft direction) to the bulkhead 82, thereby axially overlapping at least (or only) the LPC section 41A. The aft inner housing compartment 102 may be formed by and extend radially between the inner case 76 and the aft inner flowpath wall 88. This aft inner housing compartment 102 may also extend axially along the inner case 76 and the aft inner flowpath wall 88 (in the upstream, forward direction) to the bulkhead 82, thereby axially overlapping at least (or only) one or more of the engine sections 41B-43B.

The outer housing structure 30 of FIG. 1 includes an outer case 104 (e.g., a fan case) for the turbine engine 24, and an outer nacelle structure 106. The outer case 104 is disposed radially outboard of, extends axially along and may circumscribe the propulsor section 40 and its propulsor rotor 60. The outer case 104 may thereby house and may be configured as a containment structure for the propulsor section 40 and its propulsor rotor 60. The outer nacelle structure 106 is configured to provide an aerodynamic cover over the outer case 104. The outer housing structure 30 and its outer nacelle structure 106 may also form a radial outer peripheral boundary of the bypass flowpath 50. Of course, where the aircraft propulsion system 22 is alternatively configured as an open propulsor rotor propulsion system (e.g., the propulsor rotor 60 is an open propulsor rotor), the outer housing structure 30 may be omitted to expose the propulsor rotor 60 to an environment 108 external to the aircraft and its aircraft propulsion system 22.

During operation of the aircraft propulsion system 22 of FIG. 1, ambient air from the external environment 108 enters the aircraft propulsion system 22 and its turbine engine 24 through an airflow inlet 110. This air is propelled by the rotating propulsor rotor 60 in a downstream, aft direction towards the propulsion system aft end 38. The air propelled by the propulsor rotor 60 is subsequently split into a radial inner stream of air and a radial outer stream of air by the splitter structure 92.

The outer stream of the air propelled by the rotating propulsor rotor 60 is directed into the bypass flowpath 50 through its bypass inlet 56, which air entering the bypass flowpath 50 may be referred to as “bypass air”. The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 58 to provide forward thrust. This propulsion of the bypass air may account for a majority of the forward thrust generated by the aircraft propulsion system 22 and its turbine engine 24 of FIG. 1.

The inner stream of the air propelled by the rotating propulsor rotor 60 is directed into the core flowpath 48 through its core inlet 52, which air entering the core flowpath 48 may be referred to as “core air”. This core air is compressed by the LPC rotor 61 and the HPC rotor 62 and is directed through a diffuser plenum 111 into a combustion chamber 112 (e.g., annular combustion chamber) of a combustor 114 (e.g., annular combustor) in the combustor section 42. Fuel is injected into the combustion chamber 112 by one or more fuel injectors 116 and mixed with the compressed core air to provide a fuel-air mixture. This fuel-air mixture is ignited and combustion products thereof flow through and sequentially drive rotation of the HPT rotor 63 and the LPT rotor 64. The rotation of the HPT rotor 63 and the LPT rotor 64 respectively drive rotation of the HPC rotor 62 and the LPC rotor 61 and, thus, compression of the air received from the core inlet 52. The rotation of the LPT rotor 64 also drives rotation of the propulsor rotor 60 through the RSP drivetrain 72.

While the turbine engine 24 is described above with a particular two rotating structure arrangement (e.g., a two-spool architecture), the present disclosure is not limited thereto. For example, the LPC rotor 61 may be omitted to configure the LPT rotor 64 as a power turbine (PT) rotor for the propulsor rotor 60. The turbine engine 24 may also or alternatively include another rotating structure with a bladed compressor rotor in the compressor section 41 and a bladed turbine rotor in the turbine section 43; e.g., an intermediate speed spool for the engine core 46.

Figure 2:
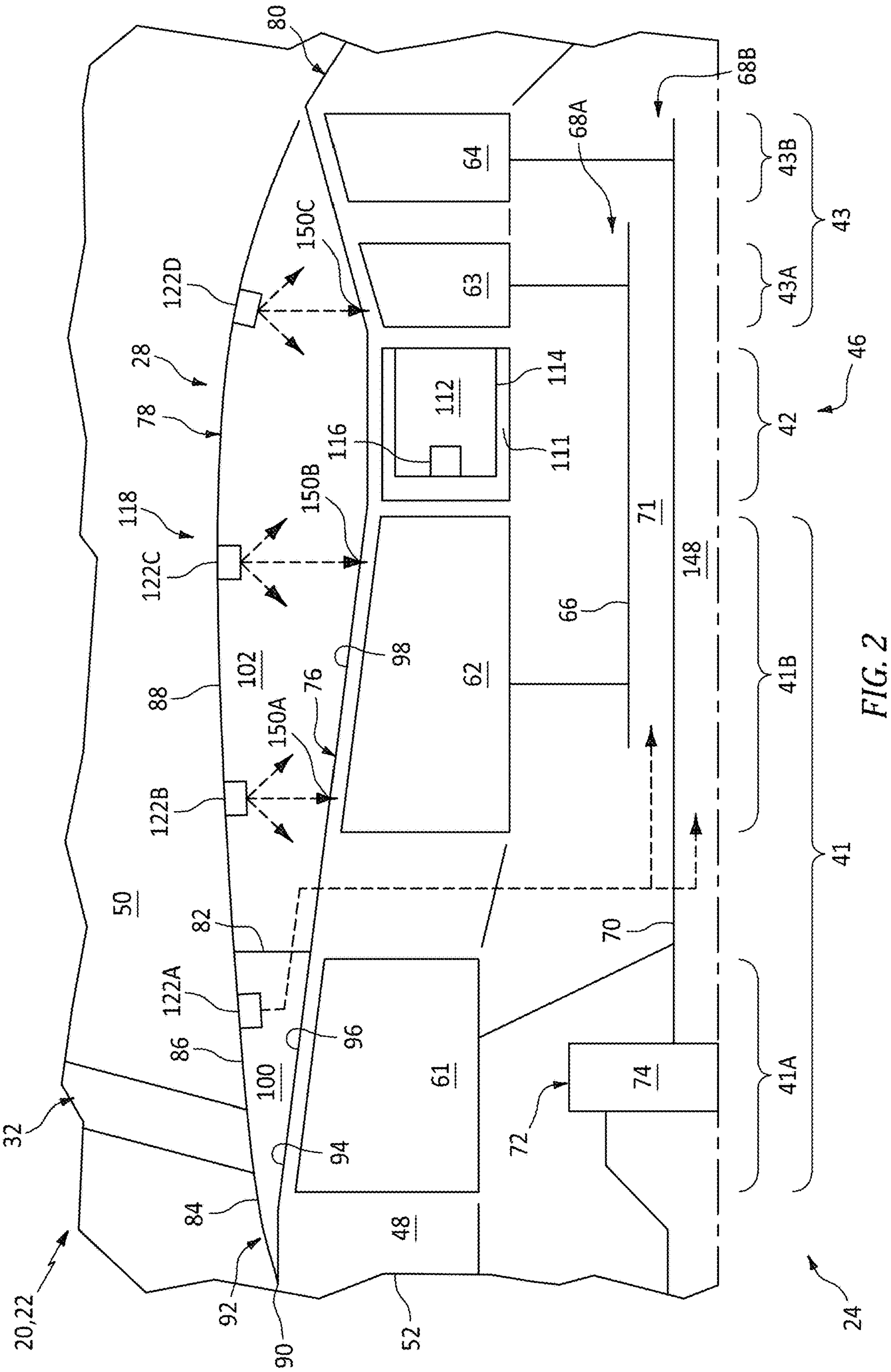
FIG. 2 is a schematic illustration of a portion of the propulsion system at a turbine engine core with a cooling system.
Figure 3:
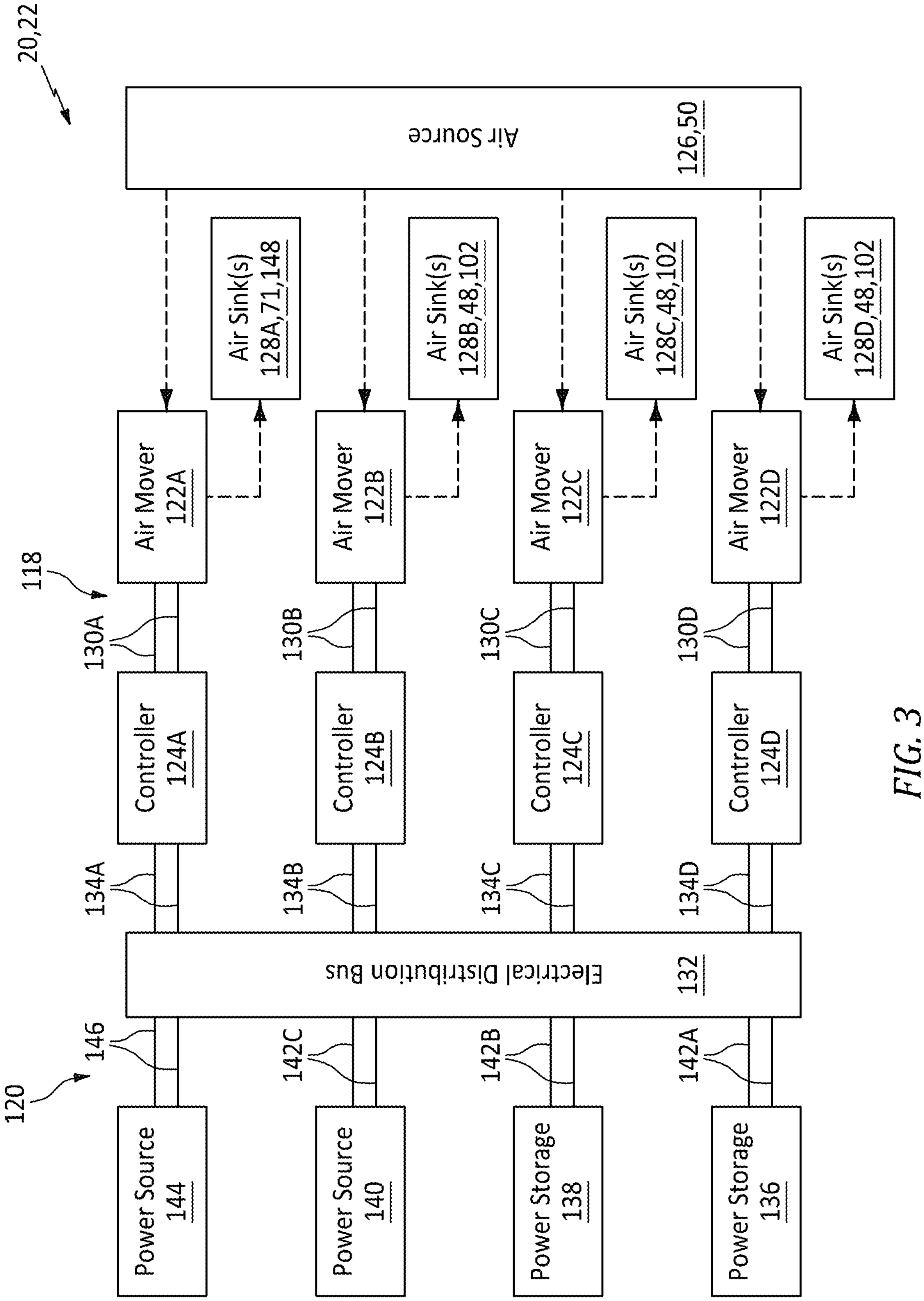
FIG. 3 is a sectional illustration of the cooling system with an aircraft electrical system.

Referring to FIG. 2, the aircraft propulsion system 22 also includes an electric cooling system 118 for the turbine engine 24. This cooling system 118 is configured to air cool one or more components of the turbine engine 24 at least (or only) following, for example, shutdown of the turbine engine 24. The cooling system 118 may thereby air cool the turbine engine 24 and its engine components when the turbine engine 24 is non-operational as described below in further detail. Referring to FIG. 3, the cooling system 118 is electrically coupled to and configured to receive electric power from an aircraft electrical system 120. Briefly, the aircraft electrical system 120 may be dedicated to and/or contained within the aircraft propulsion system 22. Alternatively, the aircraft electrical system 120 may also be arranged outside of the aircraft propulsion system 22 and/or service one or more other aircraft components and/or systems; e.g., component(s) and/or system(s) arranged with an airframe of the aircraft, component(s) and/or system(s) arranged with a companion propulsion system, and/or the like.

The cooling system 118 of FIG. 3 includes one or more electric air movers 122A-D (generally referred to as “122”) and one or more air mover (AM) controllers 124A-D (generally referred to as “124”); e.g., electric motor controllers. Each air mover 122 is configured to pump, compress and/or otherwise move air received from an air source 126 and direct that air under pressure to at least one or more air sinks 128A-D (generally referred to as “128”). Each air mover 122, for example, may be configured as or otherwise include an electric blower, an electric fan, an electric compressor and/or the like. Each air mover 122A-D of FIG. 3 is electrically coupled to a respective one of the AM controllers 124A-D through one or more electrical couplings 130A-D (generally referred to as “130”); e.g., electric cables, power buses and/or the like. Each AM controller 124 of FIG. 3 is electrically coupled to an electrical distribution bus 132 of the aircraft electrical system 120 through one or more electrical couplings 134A-D (generally referred to as “134”); e.g., electric cables, power buses and/or the like. Each AM controller 124 is configured to regulate (e.g., turn on, turn off and optionally meter) a flow of electricity from the aircraft electrical system 120 and its electrical distribution bus 132 to the respective air mover 122. Each AM controller 124 may thereby control operation of the respective air mover 122. Of course, while each air mover 122 of FIG. 3 is associated with a respective one of the AM controllers 124, the present disclosure is not limited to such an exemplary arrangement. For example, it is contemplated a single AM controller 124 may alternatively be electrically coupled to, may control and/or may otherwise be associated with some or all of the air movers 122. Moreover, while the air movers 122 and the AM controllers 124 are shown in FIG. 3 as separate devices, it is contemplated each AM controller 124 may alternatively be integrated with a respective one of the air movers 122.

The aircraft electrical system 120 of FIG. 3 includes the electrical distribution bus 132, an aircraft power storage 136, a propulsion system power storage 138 and an aircraft power source 140. The electrical distribution bus 132 is electrically coupled to each of the air movers 122 (through the AM controllers 124) as described above. The electrical distribution bus 132 is electrically coupled to each aircraft electrical system members 136, 138 and 140 respectively through one or more electrical couplings 142A-C (generally referred to as “142”); e.g., electric cables, power buses and/or the like. The electrical distribution bus 132 may also be electrically coupled to a ground power source 144 through one or more electrical couplings 146 (e.g., electric cables, power buses and/or the like) when the aircraft is on ground, for example parked at a terminal gate or other aircraft parking location. With this arrangement, the electrical distribution bus 132 provides an intermediate connection between the various electrical members 122A (via 124A), 122B (via 124B), 122C (via 124C), 122D (via 124D), 136, 138, 140 and/or 144. The air movers 122 may thereby each receive electrical power from any one or more of the power members 136, 138, 140 and/or 144.

The aircraft power storage 136 is arranged with an airframe of the aircraft and is located remote from the aircraft propulsion system 22. This aircraft power storage 136 is configured to receive electricity from the electrical distribution bus 132 and store that received electricity as potential energy. The aircraft power storage 136 is also configured to release the stored potential energy as electricity output into the electrical distribution bus 132. The aircraft power storage 136, for example, may be configured as or otherwise include one or more electricity storage devices; e.g., batteries, super capacitors, etc.

The propulsion system power storage 138 is arranged onboard the aircraft propulsion system 22 and configured with its propulsion system housing 26 (see FIG. 1). This propulsion system power storage 138 is configured to receive electricity from the electrical distribution bus 132 and store that received electricity as potential energy. The propulsion system power storage 138 is also configured to release the stored potential energy as electricity output into the electrical distribution bus 132. The propulsion system power storage 138, for example, may be configured as or otherwise include one or more electricity storage devices; e.g., batteries, super capacitors, etc.

The aircraft power source 140 is configured to generate electricity and provide that electricity to the electrical distribution bus 132. The aircraft power source 140, for example, may be configured as an electric generator powered by the turbine engine 24 (see FIG. 1). In another example, the aircraft power source 140 may be configured as an electric generator powered by another aircraft powerplant; e.g., an engine of a companion aircraft propulsion system, an engine of an auxiliary power unit (APU), a fuel cell system, and/or the like.

The ground power source 144 is configured to provide electricity to the electrical distribution bus 132, which electricity may be generated by the ground power source 144 or another power source. The ground power source 144, for example, may be configured as a ground-based electrical generator, an electric grid, a ground cart or gate power.

Referring to FIG. 2, the air movers 122A-D are arranged axially along the turbine engine 24 and its engine core 46 in an annular array. Each of these air movers 122 is mounted to the inner housing structure 28 so as to be a member of the aircraft propulsion system 22. The air movers 122 may thereby remain installed with the aircraft propulsion system 22 during turbine engine operation and aircraft flight; although, the air movers 122 themselves may be operated following shutdown of the turbine engine 24 and while the aircraft is parked on ground. The first air mover 122A of FIG. 2, for example, is mounted to the intermediate inner flowpath wall 86. This first air mover 122A is disposed vertically (e.g., with respect to gravity) above and axially aligned with the LPC section 41A and the inner case section 96, axially forward of the bulkhead 82. The air movers 122B-D of FIG. 2 are mounted to the aft inner flowpath wall 88. The second air mover 122B is disposed vertically above and axially aligned with an upstream region of the HPC section 41B and the inner case section 98, axially aft of the bulkhead 82. The third air mover 122C is disposed vertically above and axially aligned with a downstream region of the HPC section 41B and the inner case section 98. The fourth air mover 122D is disposed vertically above and axially aligned with the HPT section 43A and the inner case section 98. The present disclosure, however, is not limited to such an exemplary arrangement. For example, it is contemplated the first air mover 122A may alternatively be otherwise mounted to the inner housing structure 28 and housed within the forward inner housing compartment 100. It is also or alternatively contemplated any one or more or all of the air movers 122A-D may be otherwise mounted to the inner housing structure 28 and housed within the aft inner housing compartment 102. It is still also or alternatively contemplated the third air mover 122C (or an additional electric air mover) may be axially aligned with the combustor section 42.

Referring to FIG. 3, an airflow inlet into each air mover 122 is fluidly coupled (directly or indirectly) to the air source 126. This air source 126 may be a common air source (the same air source) for some or all of the air movers 122. The air source 126 for the air movers 122 of FIG. 3, for example, is configured as the bypass flowpath 50. The present disclosure, however, is not limited to such an exemplary air source. For example, in the case of an open rotor propulsion system where the outer housing structure 30 (see FIG. 1) is omitted, the air source 126 may be the external environment now bordering the inner housing structure 28 (see the external environment 108 of FIG. 1).

An airflow outlet from each air mover 122 is fluidly coupled (directly or indirectly) to the respective air sink(s) 128. The airflow outlet from the first air mover 122A of FIG. 2, for example, is fluidly coupled to an internal region of the turbine engine 24 and its engine core 46, radially within the core flowpath 48. More particularly, the airflow outlet from the first air mover 122A is fluidly coupled to the inner bore 71 of the high speed rotating structure 68A and/or an inner bore 148 of the low speed rotating structure 68B through a flow circuit; e.g., bleed and/or vent passages. The first air mover 122A may thereby direct cooling air into the inner bore(s) 71, 148. The airflow outlet from each of the air movers 122B-D of FIG. 2 is fluidly coupled to an interior of the inner housing structure 28 and/or the core flowpath 48. More particularly, the airflow outlet from each of the air movers 122B-D is fluidly coupled to the aft inner housing compartment 102. This aft inner housing compartment 102 is fluidly coupled to the core flowpath 48 at various locations 150A-C (generally referred to as "150") through a flow circuit (e.g., cooling passages) at each location 150. The second air mover 122B may thereby direct cooling air into both the aft inner housing compartment 102 as well as the core flowpath 48 within the upstream region of the HPC section 41B. The third air mover 122C may direct cooling air into both the aft inner housing compartment 102 as well as the core flowpath 48 within the downstream region of the HPC section 41B. The fourth air mover 122D may direct cooling air into both the aft inner housing compartment 102 as well as the core flowpath 48 within the HPT section 43A.

Figure 4:
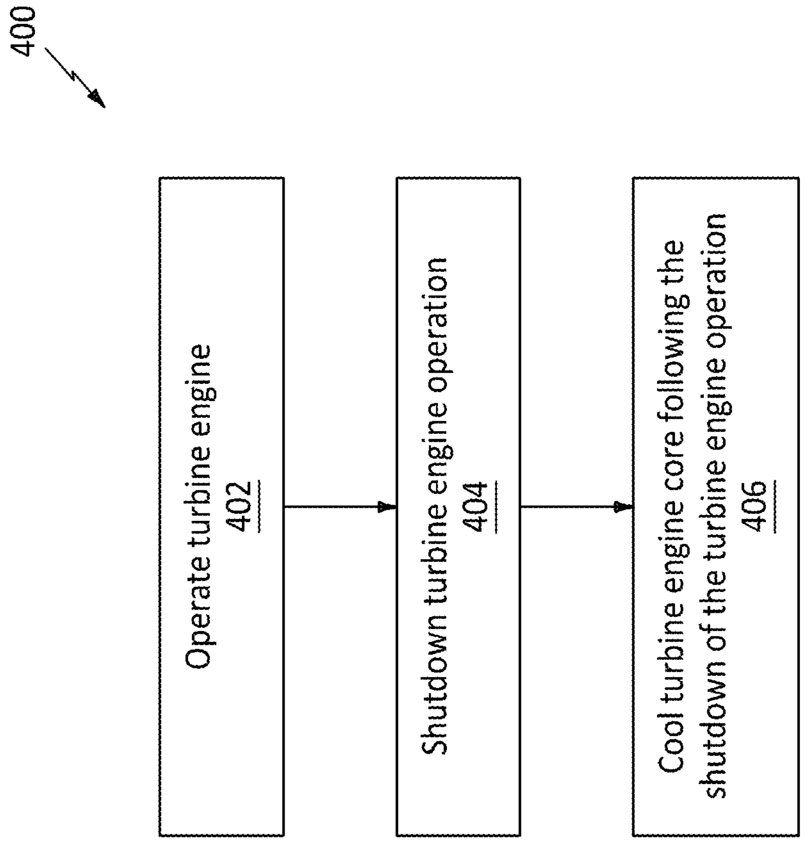
FIG. 4 is a flow diagram of a method for operating an aircraft system.

FIG. 4 is a flow diagram of a method 400 for operating an aircraft system. For ease of description, this aircraft system is described herein as including the aircraft propulsion system 22 of FIG. 1 and the cooling system 118 of FIGS. 2 and 3. The operating method 400 of the present disclosure, however, is not limited to such an exemplary aircraft system.

In step 402, the turbine engine 24 is operated as described above to facilitate aircraft operation. Briefly, this aircraft operation may include aircraft taxiing, aircraft takeoff, aircraft flight and aircraft landing. The aircraft flight includes aircraft climb, aircraft cruise and aircraft descent. During the step 402 aircraft operation, the turbine engine 24 may be operated to drive the rotation of the propulsor rotor 60 to produce thrust.

In step 404, the turbine engine 24 is shutdown following the step 402 aircraft operation. For example, following an aircraft flight, the aircraft may taxi to a terminal gate for passenger and/or cargo unloading. When the aircraft is parked at the terminal gate, the turbine engine 24 may be shutdown and the aircraft may be electrically coupled to an external electrical power source (e.g., the ground power source 144) when available to power aircraft cabin lights, an aircraft environmental control system (ECS), and/or the like as needed. To shutdown the turbine engine 24, the fuel delivery into the combustion chamber 112 is terminated (e.g., cutoff) to facilitate a flameout in the combustion chamber 112. This flameout terminates the production of the combustion products within the combustion chamber 112 such that rotation of the engine rotating structures 68A and 68B (generally referred to as "68") begin to slow and eventually stop (without intervention by a rotational drive system). When the fuel is no longer delivered to the combustion chamber 112, the combustion products are no longer being produced and the engine rotating structures 68A and 68B are thereby no longer driven by expansion of the combustion products across the turbine section 43, the turbine engine 24 is shutdown; e.g., non-operational, depowered, etc.

Without mitigation, the slowing and stopping of the rotation of the engine rotating structures 68A and 68B during (and following) the turbine engine shutdown step 404 reduces and then substantially stops airflow through the core flowpath 48. Gases such as core air and combustion products remaining in the core flowpath 48 may become stagnant, thereby substantially terminating convective cooling through the engine core 46. Thermal energy may radiate out from components (e.g., blades, disks, etc.) of the engine rotating structures 68A and 68B as well as surrounding flowpath components into the stagnant gas within the core flowpath 48 during a thermal soak-back process. This heated gas may generally move towards and collect at a vertical upper side of the core flowpath 48 generating a thermal gradient vertically across the engine rotating structures 68A and 68B. Such thermal gradients may lead to temporary deformation (e.g., warping such as bowing) of the engine rotating structures 68A and 68B and their engine shafts 66 and 70, particularly the high speed rotating structure 68A and its high speed shaft 66. Such deformation may delay subsequent aircraft operation as the deformation in the engine rotating structures 68A and 68B is ideally substantially or completely removed prior to turbine engine startup and/or turbine engine operation above engine idle.

In step 406, the cooling system 118 is energized to facilitate a cool down operation for the turbine engine 24. This cool down step 406 may be initiated as soon as the turbine engine shutdown step 404 is completed. Alternatively, the cool down step 406 may be initiated a select period of time following the completion of the turbine engine shutdown step 404. Still alternatively, the cool down step 406 may be initiated during (e.g., at an end portion of) the turbine engine shutdown step 404.

During the cool down step 406 and following shutdown of the turbine engine 24, the cooling system 118 is operated to direct cooling air from the air source 126 to the various air sinks 128. The first air mover 122A, for example, is operated to direct the cooling air into the internal region of the turbine engine 24 and its engine core 46. More particularly, the first air mover 122A may facilitate ventilation of the inner bore 71 of the high speed rotating structure 68A and/or the inner bore 148 of the low speed rotating structure 68B as well as convective cooling of the engine rotating structure(s) 68. The air movers 122B-D are operated to direct the cooling air into the aft inner housing compartment 102. The air movers 122B-D may thereby facilitate ventilation of the aft inner housing compartment 102 as well as convective cooling of aircraft propulsion system members within and/or bordering the aft inner housing compartment 102. Moreover, some of the cooling air may flow into the core flowpath 48 within the HPC section 41B and the HPT section 43A. The air movers 122B-D may thereby facilitate ventilation of the core flowpath 48 as well as convective cooling of aircraft propulsion system members within and/or bordering the core flowpath 48 at least within the HPC section 41B and the HPT section 43A. Note, the cooling air within the core flowpath 48 may also propagate into the combustor section 42 and its diffuser plenum 111 and/or combustion chamber 112 to facilitate ventilation and convective cooling thereof. By providing air cooling to the turbine engine 24 and its engine core 46 as described above, the thermal gradients within the engine core 46 may be reduced or eliminated thereby reducing or preventing deformation of the engine rotating structure(s) 68.

The cool down step 406 may be performed for a certain period of time following the shutdown of the turbine engine 24. Alternatively, the cool down step 406 may be performed until the turbine engine 24 and its engine core 46 has cooled down to a threshold temperature. Still alternatively, the cool down step 406 may be performed until the next time the turbine engine 24 is started up.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:

a turbine engine extending axially along an axis, the turbine engine including a core flowpath, a compressor section, a combustor section and a turbine section, and the core flowpath extending through the compressor section, the combustor section and the turbine section from an airflow inlet into the core flowpath to a combustion products exhaust from the core flowpath;

an inner housing structure comprising an inner case, a flowpath wall, an inner housing compartment, and a bulkhead, the inner case circumscribing the core flowpath, the flowpath wall circumscribing the inner case, the inner housing compartment defined radially between the inner case and the flowpath wall, and the bulkhead projecting radially between the inner case and the flowpath wall within the inner housing compartment; and a cooling system configured to air cool the turbine engine following shutdown of the turbine engine, the cooling system including a plurality of electric air movers, and the plurality of electric air movers arranged axially along the turbine engine, wherein a first electric air mover of the plurality of electric air movers is disposed within the inner housing compartment axially forward of the bulkhead, and a second electric air mover of the plurality of electric air movers is disposed within the inner housing compartment axially aft of the bulkhead.

2. The system of claim 1, wherein the turbine engine further includes a first rotating structure, and the first rotating structure comprises a first bladed rotor in the compressor section or the turbine section; and the first electric air mover is fluidly coupled to a bore of the first rotating structure, and the first electric air mover is configured to direct cooling air into the bore of the first rotating structure following the shutdown of the turbine engine.

3. The system of claim 2, wherein the turbine engine further includes a second rotating structure, the second rotating structure comprises a shaft and a second bladed rotor in the compressor section or the turbine section, and the shaft projects axially through the bore of the first rotating structure.

4. The system of claim 3, wherein the first electric air mover is further fluidly coupled to a bore of the second rotating structure, and the first electric air mover is further configured to direct the cooling air into the bore of the second rotating structure following the shutdown of the turbine engine.

5. The system of claim 2, wherein the turbine engine further includes a second rotating structure, the second rotating structure comprises a second bladed rotor in the compressor section or the turbine section, and the first rotating structure further comprises a shaft projecting axially through a bore of the second rotating structure.

6. The system of claim 1, wherein the second electric air mover is fluidly coupled to the core flowpath within the compressor section, and the second electric air mover is configured to direct cooling air into the core flowpath within the compressor section following the shutdown of the turbine engine.

7. The system of claim 6, wherein the plurality of electric air movers comprise a third electric air mover fluidly coupled to the core flowpath within the compressor section, and third second electric air mover is configured to direct additional cooling air into the core flowpath within the compressor section following the shutdown of the turbine engine.

8. The system of claim 1, wherein the second electric air mover is fluidly coupled to the core flowpath within the turbine section, and the second electric air mover is configured to direct cooling air into the core flowpath within the turbine section following the shutdown of the turbine engine.

9. The system of claim 1, wherein the second electric air mover is fluidly coupled to the inner housing compartment, and the second electric air mover is configured to direct cooling air into the inner housing compartment following the shutdown of the turbine engine.

10. The system of claim 9, wherein the plurality of electric air movers comprise a third electric air mover fluidly coupled to the inner housing compartment, and the third electric air mover is configured to direct additional cooling air into the inner housing compartment following the shutdown of the turbine engine.

11. The system of claim 1, wherein one or more of the plurality of electric air movers are axially aligned with the compressor section along the axis.

12. The system of claim 1, wherein at least one of the plurality of electric air movers is axially aligned with the turbine section along the axis.

13. The system of claim 1, wherein the flowpath wall defines an radially inner peripheral boundary of a bypass flowpath, the plurality of electric air movers are mounted to the flowpath wall, and the bypass flowpath is a common air source for the plurality of electric air movers.

14. The system of claim 1, further comprising an electric power source independent of the turbine engine, at least one of the plurality of electric air movers electrically coupled to and configured to receive electric power from the electric power source.

15. The system of claim 1, further comprising an electric power storage, at least one of the plurality of electric air movers electrically coupled to and configured to receive electric power from the electric power storage.

16. The system of claim 1, wherein at least one of the plurality of electric air movers is electrically couplable to and operable to receive electric power from an apparatus outside of the aircraft.

17. A system for an aircraft, comprising:

a turbine engine extending axially along an axis, the turbine engine including a core flowpath, a first rotating structure, a compressor section, a combustor section and a turbine section, the core flowpath extending through the compressor section, the combustor section and the turbine section from an airflow inlet into the core flowpath to a combustion products exhaust from the core flowpath, and the first rotating structure including a compressor rotor in the compressor section and a turbine rotor in the turbine section;

an inner housing structure comprising an inner case, a flowpath wall, an inner housing compartment, and a bulkhead, the inner case circumscribing the core flowpath, the flowpath wall circumscribing the inner case, the inner housing compartment defined radially between the inner case and the flowpath wall, and the bulkhead projecting radially between the inner case and the flowpath wall within the inner housing compartment; and a cooling system configured to air cool the turbine engine, the cooling system comprising a first electric air mover fluidly coupled to a bore of the first rotating structure, and the first electric air mover configured to direct cooling air into the bore of the first rotating structure, wherein the first electric air mover is disposed within the inner housing compartment axially forward of the bulkhead.

18. The system of claim 17, wherein the cooling system further comprises a second electric air mover fluidly coupled to the core flowpath within a core of the turbine engine, and the second electric air mover is configured to direct additional cooling air into the core flowpath, wherein the second electric air mover is disposed within the inner housing compartment axially aft of the bulkhead.

19. The system of claim 17, wherein the cooling system further comprises a second electric air mover fluidly coupled to the inner housing compartment, and the second electric air mover is configured to direct additional cooling air into the inner housing compartment, wherein the second electric air mover is disposed within the inner housing compartment axially aft of the bulkhead.

20. A system for an aircraft, comprising:

a turbine engine extending axially along an axis, the turbine engine including a core flowpath, a compressor section, a combustor section and a turbine section, and the core flowpath extending through the compressor section, the combustor section and the turbine section from an airflow inlet into the core flowpath to a combustion products exhaust from the core flowpath;

an inner housing structure comprising an inner case, a flowpath wall, an inner housing compartment, and a bulkhead, the inner case circumscribing the core flowpath, the flowpath wall circumscribing the inner case and defining a radially inner peripheral boundary of a bypass flowpath, the inner housing compartment defined radially between the inner case and the flowpath wall, and the bulkhead projecting radially between the inner case and the flowpath wall within the inner housing compartment; and a cooling system configured to air cool the turbine engine, the cooling system comprising a first electric air mover fluidly coupled to (a) the inner housing compartment and (b) the core flowpath within a core of the turbine engine, and the first electric air mover configured to direct cooling air into the inner housing compartment and the core flowpath, wherein the first electric air mover is disposed within the inner housing compartment axially aft of the bulkhead, the first electric air mover is mounted to the flowpath wall, and the bypass flowpath is an air source for the first electric air mover.

* * * * *